(12) United States Patent
Chuang et al.

(10) Patent No.: US 12,555,323 B1
(45) Date of Patent: Feb. 17, 2026

(54) OBFUSCATING 3D REPRESENTATION DATA FOR PRIVACY

(71) Applicant: Apple Inc., Cupertino, CA (US)

(72) Inventors: Ming Chuang, Bellevue, WA (US);
Praveen Gowda Ippadi Veerabhadre Gowda, San Jose, CA (US); Baptiste Angles, Seattle, WA (US)

(73) Assignee: Apple Inc., Cupertino, CA (US)

( * ) Notice: Subject to any disclaimer, the term of this patent is extended or adjusted under 35 U.S.C. 154(b) by 172 days.

(21) Appl. No.: 18/215,964

(22) Filed: Jun. 29, 2023

Related U.S. Application Data

(60) Provisional application No. 63/357,567, filed on Jun. 30, 2022.

(51) Int. Cl.
*G06T 17/20* (2006.01)
*G06F 21/62* (2013.01)

(52) U.S. Cl.
CPC ........ *G06T 17/205* (2013.01); *G06F 21/6245* (2013.01)

(58) Field of Classification Search
CPC .......................... G06T 17/205; G06F 21/6245
See application file for complete search history.

(56) References Cited

U.S. PATENT DOCUMENTS

| | | | |
|---|---|---|---|
| 8,947,512 B1 * | 2/2015 | Johnston | H04N 13/144 348/56 |
| 9,799,096 B1 | 10/2017 | De La Torre et al. | |
| 11,361,524 B1 * | 6/2022 | Kim | G06T 17/00 |
| 2018/0114368 A1 * | 4/2018 | Marketsmueller | G06F 3/04883 |
| 2020/0159936 A1 * | 5/2020 | Anderson | G06F 21/84 |
| 2021/0182947 A1 * | 6/2021 | Wade | G06T 15/205 |
| 2022/0068029 A1 * | 3/2022 | Lane | G06F 3/0482 |
| 2023/0042369 A1 * | 2/2023 | Böckem | G06T 15/04 |
| 2023/0388357 A1 * | 11/2023 | Faulkner | H04L 12/1822 |
| 2024/0290056 A1 * | 8/2024 | Thomas | G06T 17/00 |

OTHER PUBLICATIONS

Jain, Anant; "Breaking neural networks with adversarial attacks"; Feb. 9, 2019, pp. 1-3.
Jorg; Sophie, Ye, Yuting, Neff, Michael, Mueller, Franziska and Zordan, Victor; "Virtual Hands in VR: Motion Capture, Synthesis and Perception" SIGGRAPH 2020 Course; Aug. 17, 2020, pp. 1-145.
Kada, Martin, Peter, Michale, Fritsch, Dieter, Siemoneit, Oliver; Hubig, Christoph; Privacy-Enabling Abstraction and Obfuscation Techniques for 3D City Models (Position Paper); ACM SPRINGL '09, Nov. 3, 2009; pp. 1-6.

* cited by examiner

*Primary Examiner* — Xiao M Wu
*Assistant Examiner* — Latrell Anthony Creary
(74) *Attorney, Agent, or Firm* — Thompson Hine LLP

(57) ABSTRACT

Various implementations disclosed herein include devices and methods that obtain and/or maintain a version of a 3D representation of a user's environment and provide limited access to the 3D representation to apps executing on the devices. This may involve providing changed versions of a 3D representation that obfuscate details of the 3D representation from which the apps would otherwise be able to determine or infer private information about the user and/or their physical environment. Versions of the 3D representation provided to one or more apps may be changed in various ways to make it difficult or impossible for an app to uniquely identify a user or their physical environment and/or make it difficult or impossible to determine private information about the user and/or the physical environment.

21 Claims, 8 Drawing Sheets

OBFUSCATING 3D REPRESENTATION DATA FOR PRIVACY

CROSS-REFERENCE TO RELATED APPLICATIONS

This application claims the benefit of U.S. Provisional Application Ser. No. 63/357,567 filed Jun. 30, 2022, which is incorporated herein in its entirety.

TECHNICAL FIELD

The present disclosure generally relates to electronic devices that use sensors in physical environments to generate three dimensional (3D) representations (e.g., scene reconstructions) of those physical environments for use by apps executing thereon.

BACKGROUND

Existing systems and techniques may be improved with respect to assessing and using sensor data in processes that generate 3D representations representing physical environments.

SUMMARY

Various implementations disclosed herein include devices and methods that obtain and/or maintain a version of a 3D representation of a user's environment and provide limited access to the 3D representation to apps executing on the devices. This may involve providing changed versions of a 3D representation that obfuscate details of the 3D representation from which the apps would otherwise be able to determine or infer private information about the user and/or their physical environment. Versions of the 3D representation provided to one or more apps may be changed in various ways to make it difficult or impossible for an app to uniquely identify a user or their physical environment and/or make it difficult or impossible to determine private information about the user and/or the physical environment.

In some implementations, a processor performs a method by executing instructions stored on a computer readable medium. The method obtains a first version (e.g., a global/system version) of a 3D representation of a physical environment. The 3D representation, for example, may be generated and/or updated based on sensor data obtained in the physical environment. The 3D representation may be generated based on images, depth data, motion data, etc. The 3D representation may be a point cloud, a 3D mesh, a parametric 3D representation, or any other type of 3D representation and may include data about the 3D shape, texture, semantics labels, and/or other attributes of the represented physical environment.

The method generates a second version (e.g., an app-specific version) of the 3D representation to provide to an app on the electronic device. The second version obfuscates data of the 3D representation indicative of an identity or an attribute of the physical environment. In some implementations, different apps are provided with different versions of the 3D representation which, among other things, may make it more difficult for the apps to compare 3D representations to uniquely identify a user, their environment, or other private information. In some implementations, over time, a given app may be provided with different versions of the 3D representation. The method provides the app access to the second version of the 3D representation, where the first version of the 3D representation is not accessible to the app. The method may provide a 3D environment (e.g., a 3D extended reality (XR) environment) in which the app provides 3D content based on its access to the second version of the 3D representation.

Obfuscating the data may involve various privacy-protection processes. As non-limiting examples, the obfuscating may involve: changing an identifier of the 3D representation; changing the number of vertices, faces, and/or chunks of the 3D representation; changing a 3D representation by, for example, adding face or vertices or generating a different triangulation; avoiding memory address matching by providing per app copies and/or opaque objects; applying relatively small changes to 3D representation (e.g., curvature changes) to avoid geometric description matching; changing coordinate systems; and/or changing the represented volume or adding face walls/surfaces to avoid volume matching; and change/round object measurements (e.g., TV size, countertop, etc.).

Various implementations disclosed herein include devices, systems, and methods that obtain and/or maintain a 3D representation of a user's environment and provide apps access to functions (e.g., shader-based processes) that process or provide information about the 3D representation without giving the apps access to the 3D representation. In some implementations, a processor performs a method by executing instructions stored on a computer readable medium. The method obtains a 3D representation of a physical environment, the 3D representation generated based on sensor data obtained in the physical environment. The method executes a function (e.g., a rendering function executed by a write shader) initiated by an app to use the 3D representation and provides a response to the app based on the executing of the function. The response obfuscates data of the 3D representation indicative of an identity or an attribute of the physical environment. The response may obfuscate the data by abstracting specifics of objects, for example, by identifying a wall rather than the hundreds of triangles representing the wall or by providing a bounding box of a chair without providing other details about the chair. As another example, the response may additionally or alternatively obfuscate the data by adding noise.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
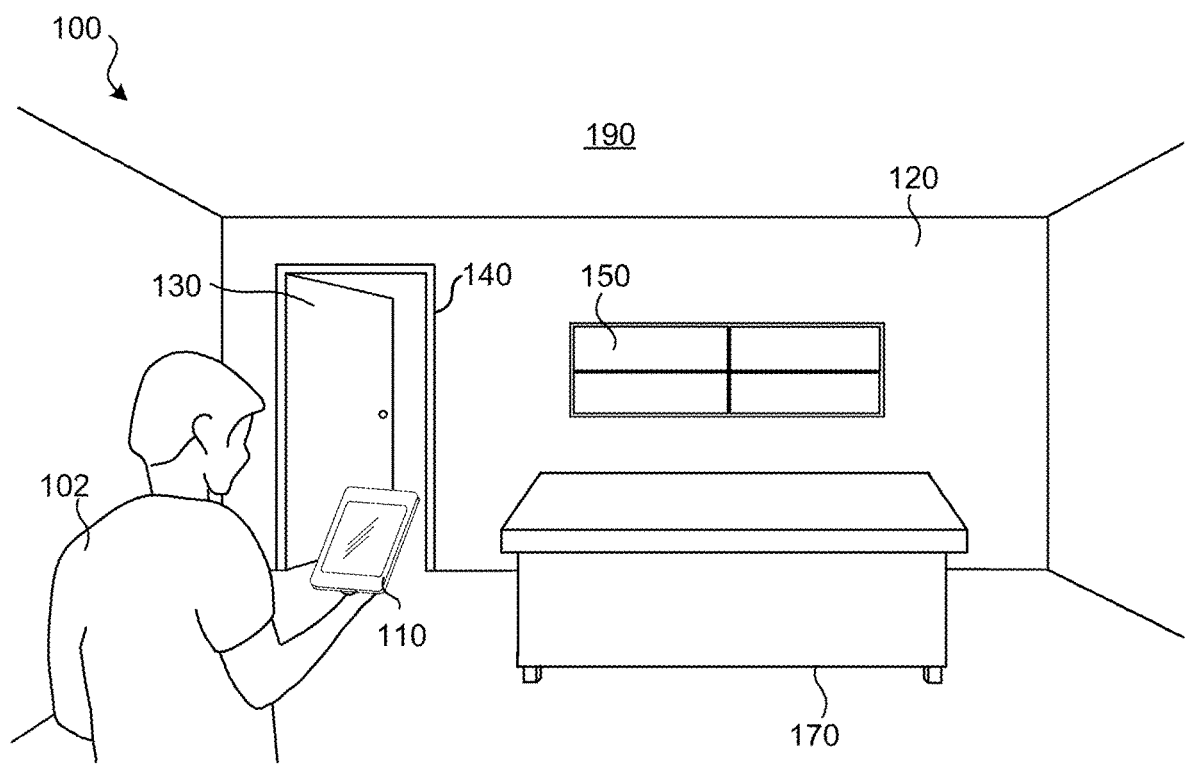
FIG. 1 illustrates an electronic device in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary physical environment 100. FIG. 1 illustrates an exemplary electronic device 110 operating in a room of the physical environment 100, for example, to generate and/or use a 3D representation of the physical environment 100. In this example, the room includes a door 130 providing an opening leading to a second room of the physical environment 100 which may or may not also be included in the 3D representation. The room also includes a door frame 140, a window 150 on wall 120, and a desk 170.

The electronic device 110 includes one or more cameras, microphones, depth sensors, motion sensors, or other sensors that can be used to capture information about and evaluate the physical environment 100. The obtained sensor data may be used to generate a 3D representation, such as a 3D point cloud, a 3D mesh, a 3D floor plan, a 3D room plan, a parametric representation, or any other type of 3D representation of the physical environment 100.

In one example, the user 102 moves around the physical environment 100 and the device 110 captures sensor data from which one or more 3D representations of the physical environment 100 are generated. The device 110 may be moved to capture sensor data from different viewpoints, e.g., at various distances, viewing angles, heights, etc. In some implementations, light-intensity-based (e.g., RGB, black and white, etc.) image from a camera, depth-based images from a light sensor, and positional data (e.g., derived from the images and/or using motion sensors) is used to identify 3D positions of portions of the physical environment 100. In some implementations, such data is used to generate a point-based representation, such as a 3D point cloud 200 (FIG. 2), that represents the 3D positions of portions of surfaces within the physical environment 100. In some implementations, a 3D representation of the physical environment 100 is generated using a simultaneous localization and mapping (SLAM) technique.

Figure 2:
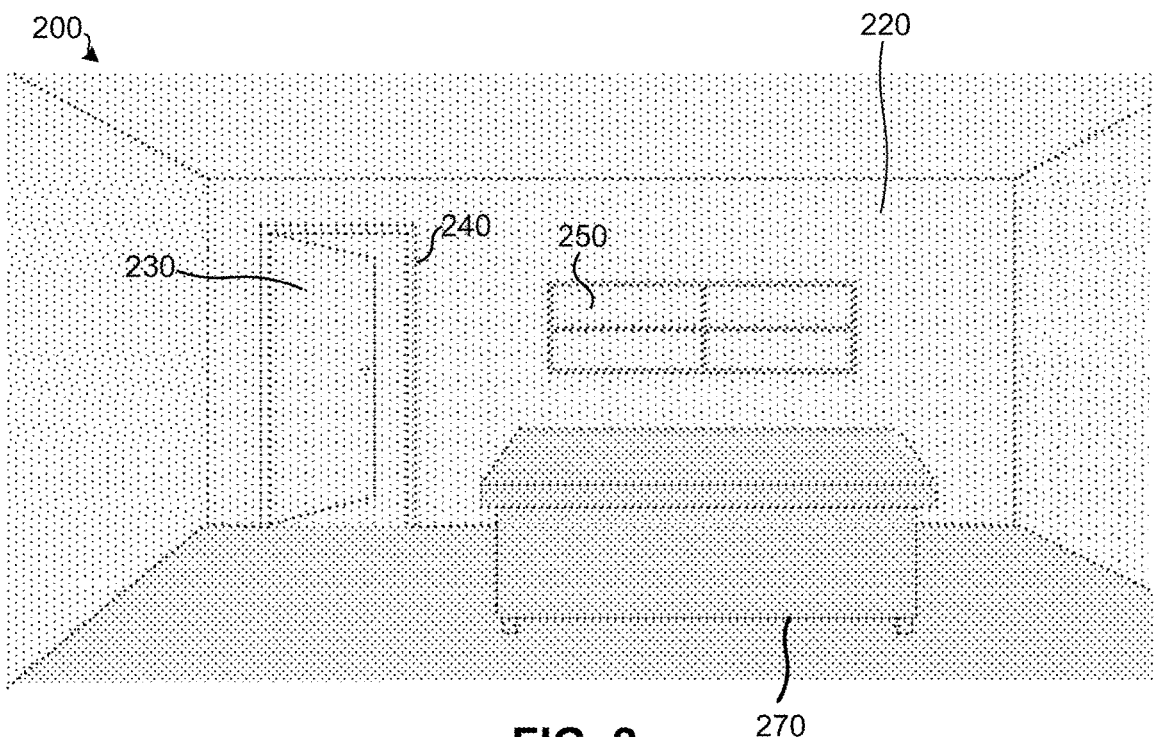
FIG. 2 illustrates a portion of a 3D point cloud representing the room of FIG. 1 in accordance with some implementations.

FIG. 2 illustrates a portion of a 3D point cloud representing the physical environment 100 of FIG. 1. In some implementations, the 3D point cloud 200 is generated based on one or more images (e.g., greyscale, RGB, etc.), one or more depth images, and motion data regarding movement of the device in between different image captures. In some implementations, an initial 3D point cloud is generated based on sensor data and then the initial 3D point cloud is densified via an algorithm, machine learning model, or other process that adds additional points to the 3D point cloud. The 3D point cloud 200 may include information identifying 3D coordinates of points in a 3D coordinate system. Each of the points may be associated with characteristic information, e.g., identifying a color of the point based on the color of the corresponding portion of an object or surface in the physical environment 100, a surface normal direction based on the surface normal direction of the corresponding portion of the object or surface in the physical environment 100, a semantic label identifying the type of object with which the point is associated, etc.

In the example of FIG. 2, the 3D point cloud 200 includes a set of points 220 representing wall 120, a set of points 230 representing door 130, a set of points 240 representing the door frame 240, a set of points 250 representing the window 150, and a set of points 270 representing the desk 170. In this example, the points of the 3D point cloud 200 are depicted with relative uniformity and with points on object edges emphasized to facilitate easier understanding of the figure. However, it should be understood that the 3D point cloud 200 need not include uniformly distributed points and need not include points representing object edges that are emphasized or otherwise different than other points of the 3D point cloud 200.

The 3D point cloud 200 may be used to identify one or more boundaries and/or regions (e.g., walls, floors, ceilings, etc.) within the physical environment 100 and such identifications may be included in the 3D representation. The relative positions of these surfaces may be determined relative to the physical environment 100 and/or the 3D point cloud 200. In some implementations, a plane detection algorithm, machine learning model, or other technique is performed using sensor data and/or a 3D point-based representation (such as 3D point cloud 200). The plane detection algorithm may detect the 3D positions in a 3D coordinate system of one or more planes of physical environment 100. The detected planes may be defined by one or more boundaries, corners, or other 3D spatial parameters. The detected planes may be associated with one or more types of features, e.g., wall, ceiling, floor, table-top, counter-top, cabinet front, etc., and/or may be semantically labelled. Detected planes associated with certain features (e.g., walls, floors, ceilings, etc.) may be analyzed with respect to whether such planes include windows, doors, and openings.

Similarly, the 3D point cloud 200 may be used to identify one or more boundaries or bounding boxes around one or more objects, e.g., a bounding box corresponding to table 170.

Figure 3:
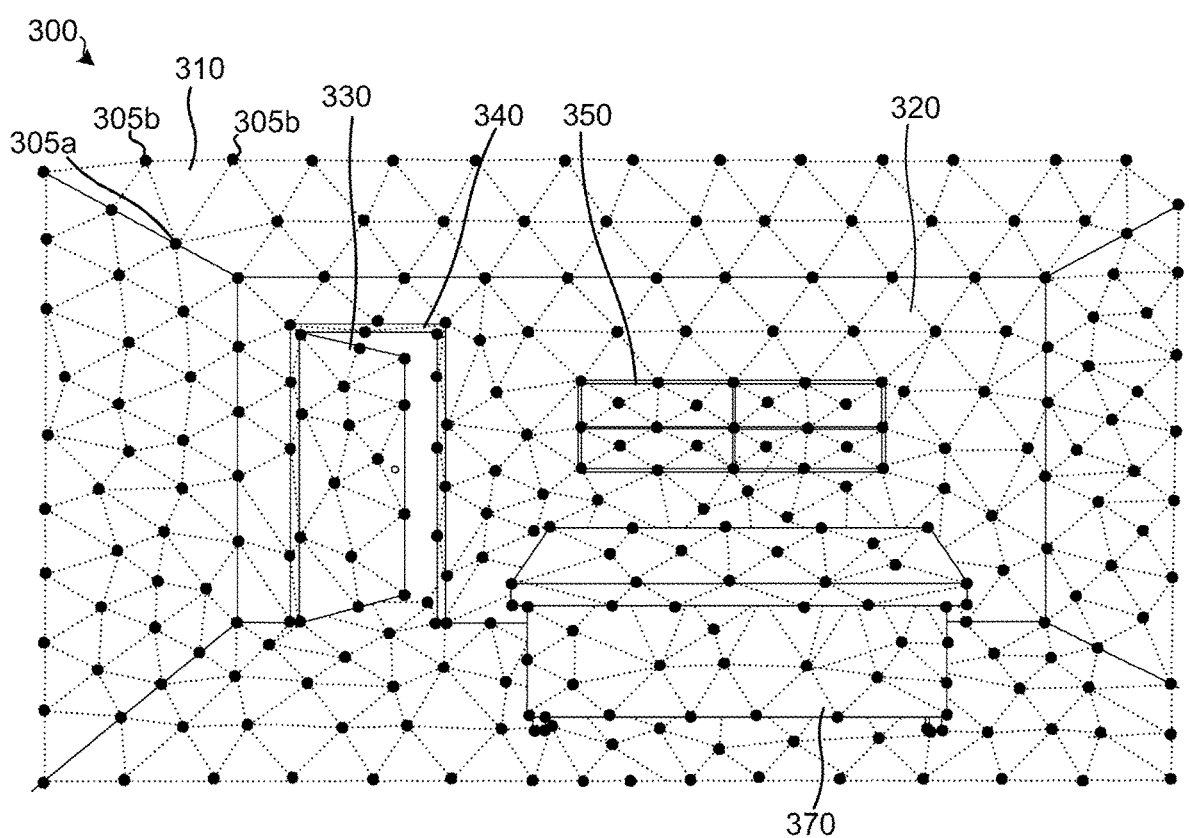
FIG. 3 illustrates a portion of a 3D mesh representing the room of FIG. 1 in accordance with some implementations.

FIG. 3 illustrates a portion of a 3D mesh 300 representing the physical environment 100 of FIG. 1. The 3D mesh includes vertices (e.g., vertices 305*a-c*) that form faces (e.g., triangular face 310 formed/defined by vertices 305*a-c*). For example, the vertices of the 3D mesh 300 may have 3D coordinates such that groups of the mesh points identify surface portions, e.g., triangles, corresponding to surfaces of the physical environment 100. The 3D mesh 300 may be generated directly from sensor data and/or based on another 3D representation of the physical environment 100. In some implementations, a 3D mesh, such as 3D mesh 300, is generated based on a point cloud, such as 3D point cloud 200 (FIG. 2). The vertices and/or associated mesh shapes (e.g., triangles) may be associated with color, surface normal directions, and/or semantic labels which, in the case of generation based on a 3D point cloud, may be derived from such data associated with points of the 3D point cloud.

In the example of FIG. 3, the 3D mesh 300 includes vertices that define triangular faces 320 representing wall 120, vertices that define triangular faces 330 representing door 130, vertices that define triangular faces 340 representing the door frame 140, vertices that define triangular faces 350 representing the window 150, and vertices that define triangular faces 370 representing the desk 170. In this example, edges between objects are shown as solid lines and edges within an object's surface are shown with dashed lines to facilitate easier understanding of the figure. However, it should be understood that the 3D mesh 300 itself may not distinguish between such edges, i.e., all edges formed by connecting vertices may be of the same type.

The 3D mesh 300 may be used to identify one or more boundaries and/or regions (e.g., walls, floors, ceilings, etc.) within the physical environment 100 and such identifications may be included in the 3D representation. The relative positions of these surfaces may be determined relative to the physical environment 100 and/or the 3D mesh 300. In some implementations, a plane detection algorithm, machine learning model, or other technique is performed to detect the 3D positions in a 3D coordinate system of one or more planes of physical environment 100. The detected planes may be defined by one or more boundaries, corners, or other 3D spatial parameters. The detected planes may be associated with one or more types of features, e.g., wall, ceiling, floor, table-top, counter-top, cabinet front, etc., and/or may be semantically labelled. Detected planes associated with certain features (e.g., walls, floors, ceilings, etc.) may be analyzed with respect to whether such planes include windows, doors, and openings. Similarly, the 3D mesh 300 may be used to identify one or more boundaries or bounding boxes around one or more objects, e.g., a bounding box corresponding to table 170.

In some implementations, device 110 includes global/system level functionality (e.g., functionality provided by an operating system (OS) or other general system components) that obtains sensor data and uses the sensor data to generate a 3D representation such as 3D point cloud 200 and/or 3D mesh 300. In some implementations, such OS or other system components generate an initial 3D representation and then update the 3D representation over time, e.g., as more sensor data regarding physical environment 100 is obtained.

In some implementations, such OS or system components use the 3D representation to provide a user experience. For example, the 3D representation may be used to provide views of an extended reality (XR) environment in which virtual content, such as OS user interface content, is provided based on the 3D representation. As a specific example, such OS user interface content may include icons representing individual apps that can be executed and used on the device 110. Such apps may be operated by the OS provider and/or third-party app providers. In either case, it may be useful to provide the individual apps access to at least some aspects of the 3D representation. For example, an app may include functionality that positions its own user interface content based on the 3D representation (e.g., so that the content appears on a wall or table or interacts with objects represented in the 3D representation).

In some implementations, aspects of the 3D representation that are made accessible to an app are limited to reduce or eliminate instances of data misuse and/or to otherwise protect user privacy. For example, an app may misuse the 3D representation of a user's physical environment to build a profile of a user and/or their environment and use that profile to identify the user and/or environment in circumstances in which the user expects or desires that such information be private. As a specific example, it may be undesirable to provide aspects of a 3D representation that facilitate tracking a user (e.g., matching their identity) as the user first uses a social media app and then uses a shoe shopping app. Unique aspects of the 3D representation may be matched to make such identifications. Apps could use unlimited access to the 3D representation data to uniquely identify a user and/or the user's device.

Another potential concern is that the 3D representation could be used to recognize a physical environment. This could be a public space, which would enable an app to localize a user without getting permission for such location data or a private physical environment, which could be used to infer relationships between users by matching their physical environments' 3D representations (e.g., determining that two users live in the same house, etc.)

Accordingly, it may be desirable to provide an app with access to the 3D representation in a way in which it is difficult or impossible to uniquely match and track the user while still enabling the app to provide desirable experience based on the relevant aspects of the 3D representation, e.g., positioning user interface content relative to other portions of an XR environment based on the 3D representation.

In some implementations, device 110 maintains a global/system copy of a 3D representation and provides altered versions of the 3D representation to the one or more apps that are executed on the device 110. Such copies of 3D representations may be altered so that the data in the copies is difficult or impossible to use to identify a user and/or their physical environment. Various techniques may be used (alone or in combination) to obfuscate 3D representation data so that app will get useful information (e.g., a physically equivalent or closely-similar 3D mesh) but such that identifying the user or environment is difficult or impossible. The following sections describe various types of privacy "attacks" in which 3D reconstruction data might be used in an undesirable away and counters that can be used to reduce or eliminate such attacks.

A. Alter IDs to Avoid User/Environment Identification Based on ID Matching 3D representations may be associated with unique identifiers which might be compared to identify a user and/or their environment. One counter to such identification is to use different identifiers (e.g., different chunk UUIDs) for each requesting app. In some implementations, each app is given a different (i.e., per-app 3D representation identifier)

and such identifiers may be mapped (e.g., by the operating system) to the identifier of the global 3D representation such that the apps do not have access to the identifier of the global 3D representation.

Similarly, walls, floors, and other objects represented within a 3D representation may be given unique identifiers which might be compared to identify a user and/or their environment. One counter to such identification is to use different identifiers (e.g., different chunk UUIDs) for each requesting app. In some implementations, each app is given a different (i.e., per-app object identifier) and such identifiers may be mapped (e.g., by the operating system) to the identifier of the global 3D representation's object such that the apps do not have access to the identifier of the global 3D representation's object.

B. Alter Vertices/Faces/Chunks to Avoid User/Environment Identification Based on Matching Numbers of Vertices/Faces/Chunks The number of vertices, faces, and chunks in a 3D mesh may be matched to identify a user and/or their environment. One counter to such identification is alter the vertices, faces, and/or chunks of the 3D mesh for each version of the 3D mesh that is provided to a respective app. In some implementations, this may involve randomly, periodically, or otherwise eliminating a number of vertices or faces. In some implementations, this may involve adding vertices (e.g., randomly, periodically, or otherwise adding fake vertices and/or faces to the chunks sent to the apps). In some implementations, this involves giving different size mesh chunks to each app. In some implementations, this involves adding one or more new meshes within the 3D mesh such that the new meshes do not externally affect physical surface characteristics.

Figure 4A:
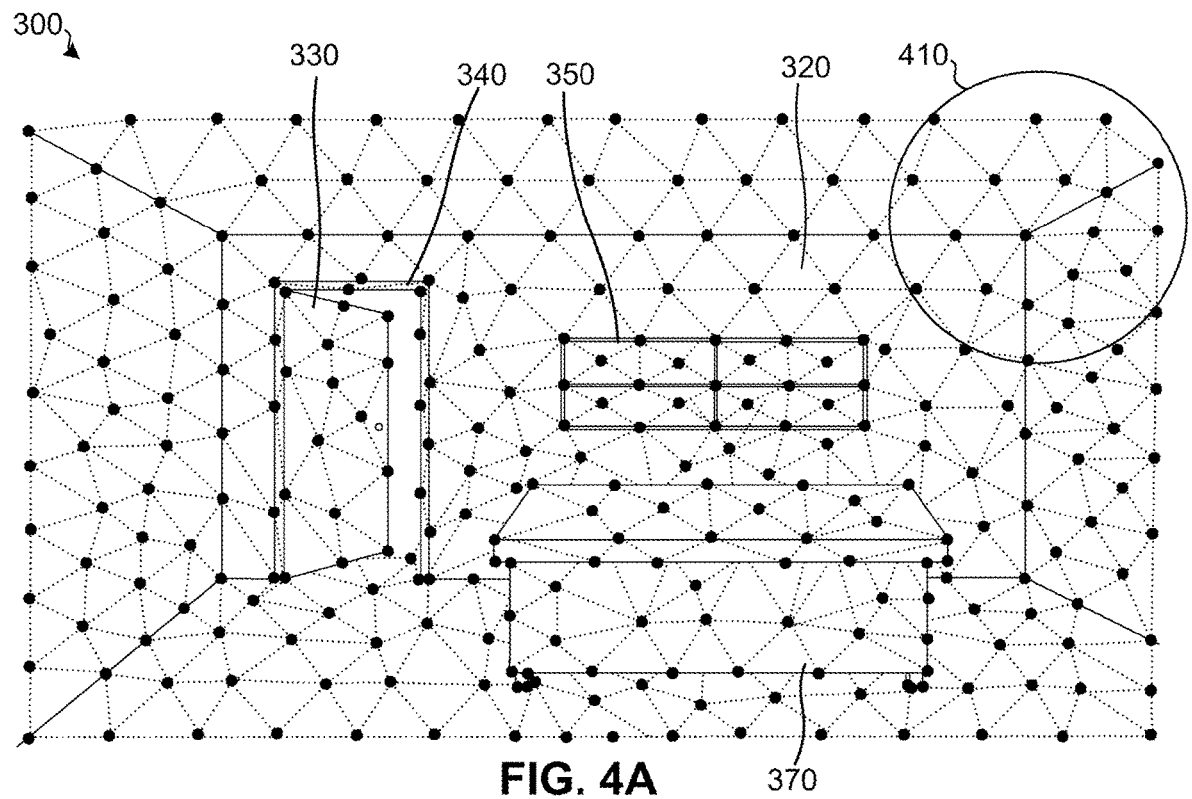
FIGS. 4A-4B illustrate changing a portion of the 3D mesh of FIG. 3 in accordance with some implementations.
Figure 4B:
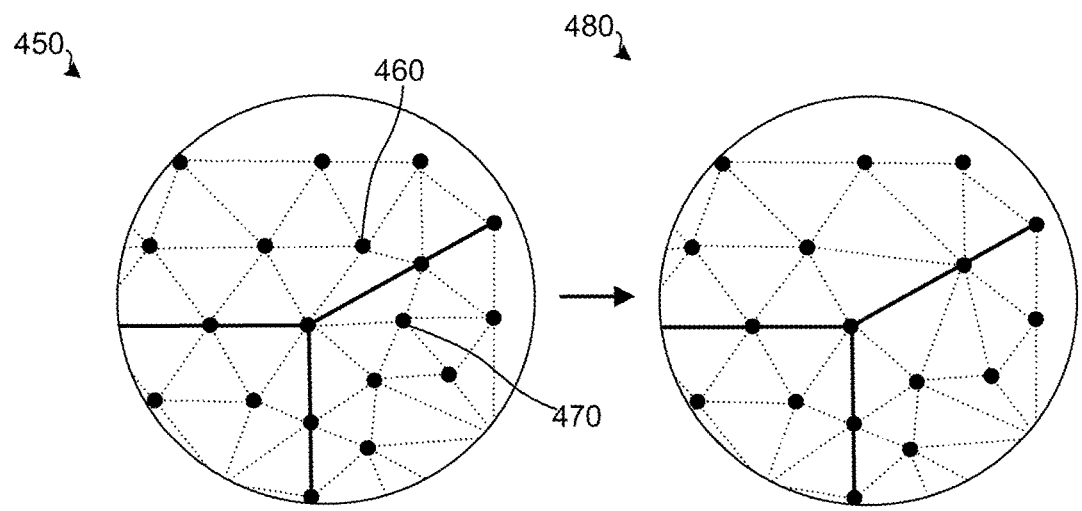

FIGS. 4A-4B illustrate changing a portion 410 of the 3D mesh 300 of FIG. 3 to provide an altered version of the 3D mesh with a different number of vertices and faces. In this example, in portion 410, several vertices and are eliminated. Vertices 460, 470, which are shown in view 450 of the corresponding portion of the mesh 300, are eliminated as shown in view 480. The multiple faces formerly separated by these vertices and the edges formed thereby are also combined into fewer faces based on the elimination of these vertices 460, 470.

C. Alter Triangulation to Avoid User/Environment Identification Based on Deduplication The number of vertices, faces, and chunks in a 3D mesh may be matched to identify a user and/or their environment after performing a de-duplication algorithm on the meshes, e.g., to remove redundant vertices before comparison. One counter to such identification is alter the triangulation of the 3D mesh for each version of the 3D mesh that is provided to a respective app. For example, this may involve extracting the mesh differently for each version such that each version has slightly different vertices positions. Such versions may have the same visual appearance without using identical triangulations.

D. Give Each App Access to its Own Local 3D Representation Copy to Avoid User/Environment Identification Based on Address Matching The address of vertex/face memory and/or buffers (e.g., pointing to the same global storage) may be matched to identify a user and/or their environment. One counter to such identification is to allocate per-app copies of the 3D representation, e.g., each app gets its own local copy of a version of the 3D representation that it accesses from a respective memory and/or buffer location. Another counter is to utilize opaque object/functions to access 3D representation data.

E. Make Minor 3D Representation Modifications Tailored to Avoid User/Environment Identification Based on Address Matching Deep learning models may be used to extract descriptor(s) of a physical environment (e.g., regarding surface curvatures, etc.) using a 3D representation. These descriptors may be invariant to small changes and noise and thus may be matched to identify a user and/or their environment. One counter is to apply small changes to the 3D representation that have been determined to thwart such descriptor matching. For example, an alteration algorithm could be generated or a machine learning model trained to make such changes based on feedback from such a deep learning model, e.g., training a 3D representation network to make alterations that break a descriptor matching model in a manner similar to the training of a generative/adversarial machine learning model.

Figure 5A:
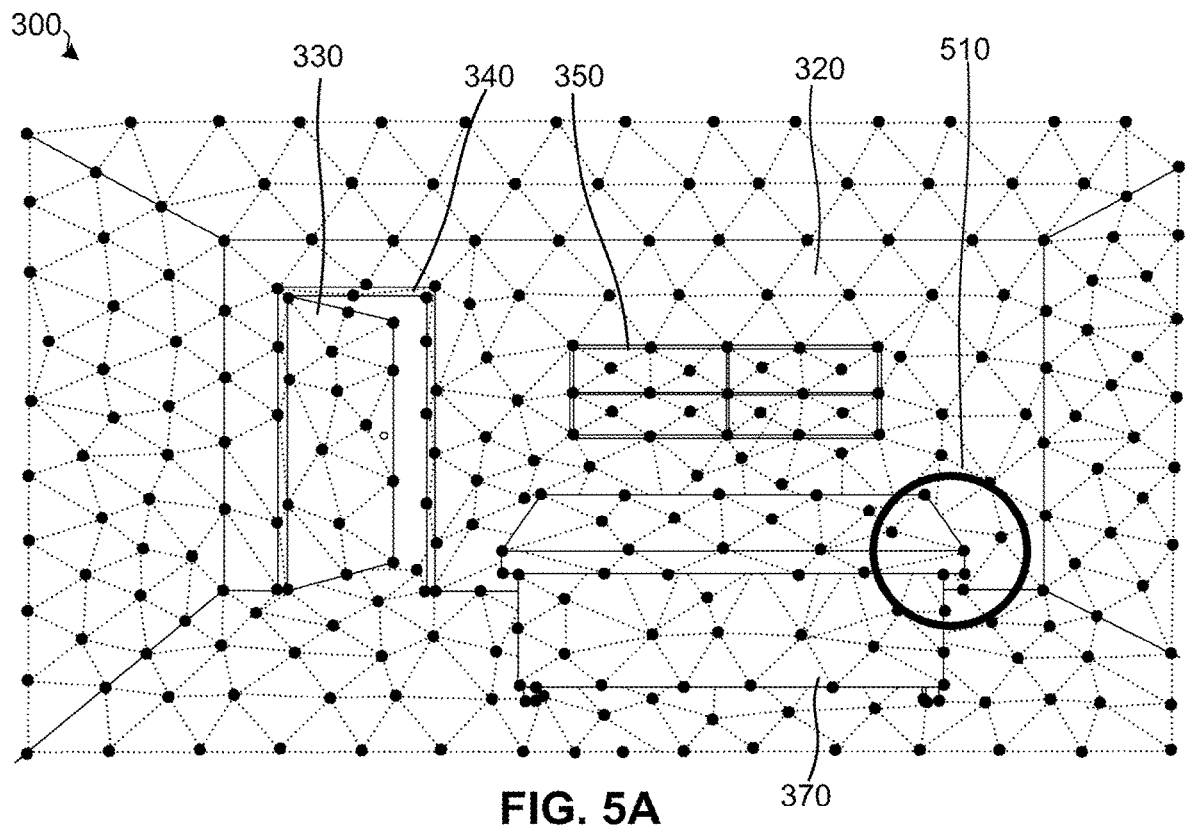
FIGS. 5A-5B illustrate changing a portion of the 3D mesh of FIG. 3 in accordance with some implementations.
Figure 5B:
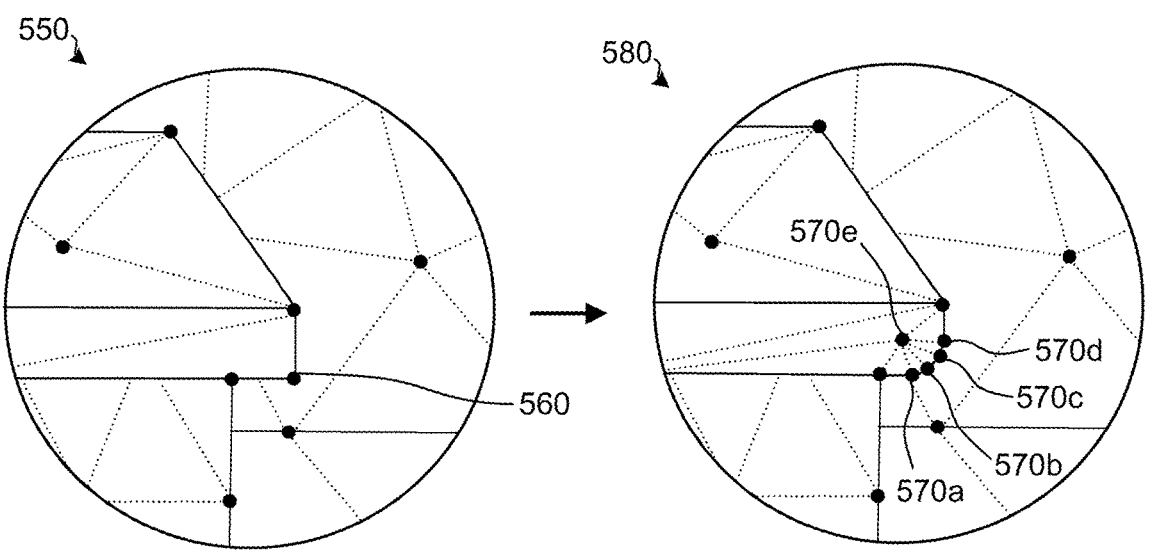

In some implementations, a 3D representation is changed by changing surfaces or edges with which user interaction is unlikely or unimportant. FIGS. 5A-5B, for example, illustrate changing a portion 510 of the 3D mesh 300 of FIG. 3 to provide an altered version of the 3D mesh with minor differences that prevent descriptor based/geometric shape matching. In this example, in portion 510, corner 560 is altered. The square/90° edges intersections at corner 560, which are shown in view 550 of the corresponding portion of the mesh 300, are altered as shown in view 580. The corner is changed to be more rounded. In this example, the more rounded shape is provided by replacing a single vertex with multiple vertices 570a-e.

F. Alter 3D Representation to Avoid User/Environment Identification Based on Matching Rasterizations 3D representations may be rasterized (e.g., to provide a 2D view from a particular viewpoint) and the rasterizations (e.g., associated depth maps) may be matched to identify a user and/or their environment. One counter is to use different coordinate systems per app to make selecting an appropriate, common viewpoint/pose to use for the rasterizations difficult. Another counter is to add small altercations/noise to each version of the 3D representation to increase the chances of a rasterization comparison failing.

G. Alter 3D Representation to Avoid User/Environment Identification Based on Volume Comparison The volume of a 3D representation may be matched to identify a user and/or their environment. One counter is to provide each app with a different volume of the 3D representation. In one example, this involves provided a volume based on a changing variable such as the devices current position where each app gets a volume of a fixed size (e.g., within a fixed size bounding box) around that position. In another example, the device may randomly or based on some heuristic hide or remove a small part of the 3D representation provided to each app.

Another counter is provide all apps on all device in all environments with the same volume represented in the 3D representations provided to them. This may involve adding fake wall/surfaces outside of the regions of interest so that the entire 3D representation has a given volume that is always the same for all device, apps, and environments.

H. Provide Indirect Access to a 3D Representation to Avoid User/Environment Identification One technique for avoiding matching 3D representations across users is to avoid giving apps direct access to the 3D representation. For example, instead of having direct access, apps may be enabled to only interact with the 3D representation via a controlled function. For example, apps may be restricted to writing/using restricted shader-like functions that process the mesh without being able to copy it or extract descriptors from it. In some implementations, apps are enabled to use a function to interact with a 3D representation where the function returns results to the app that do not include unique aspects of the 3D representation.

Figure 6:
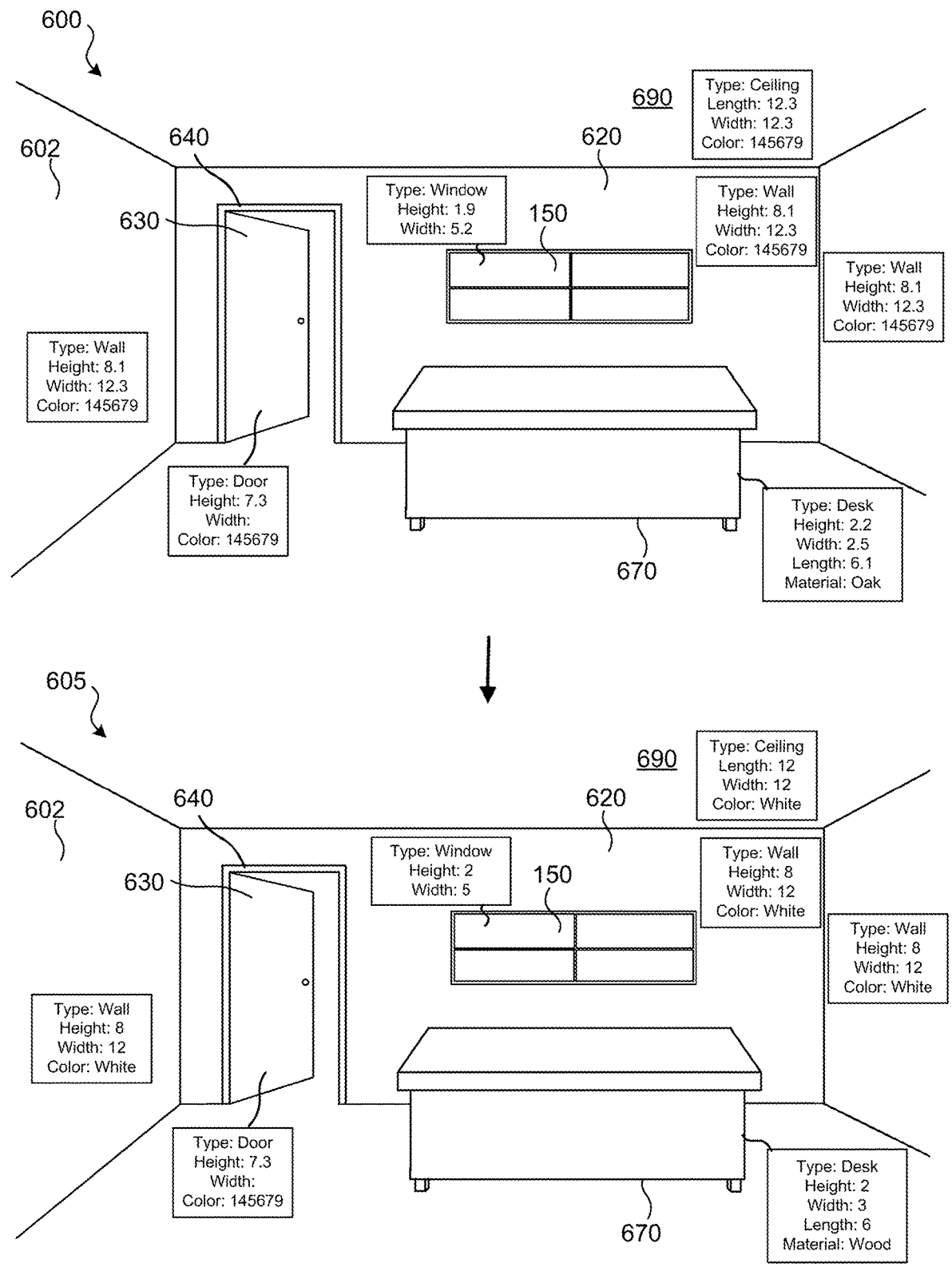
FIG. 6 illustrates changing a portion of a 3D representation in accordance with some implementations.

I. Adjust 3D Representation Semantics to Avoid User/Environment Identification 3D representations may include or be used to generate semantics (e.g., specific object sizes, materials, object types, combinations of objects, etc.) that can be matched to identify a user and/or their environment. One counter is to adjust the semantics associated with a 3D representation and/or the underlying 3D representation so that the semantic features are not uniquely identifying. For example, measurement semantics may be rounded (e.g., up or down or both) to the nearest integer to that super specific matching is not possible. FIG. 6 illustrates changing a portion of 3D representation 600 semantics to remove uniquely-identifying details. For example, semantics for the desk object (Type: Desk, Height: 2.2, Width: 2.5; Length: 6.1, Material: Oak) as shown in representation 600 may be changed to (Type: Desk, Height: 2, Width: 3; Length: 6, Material: Wood) as shown in representation 605.

Figure 7:
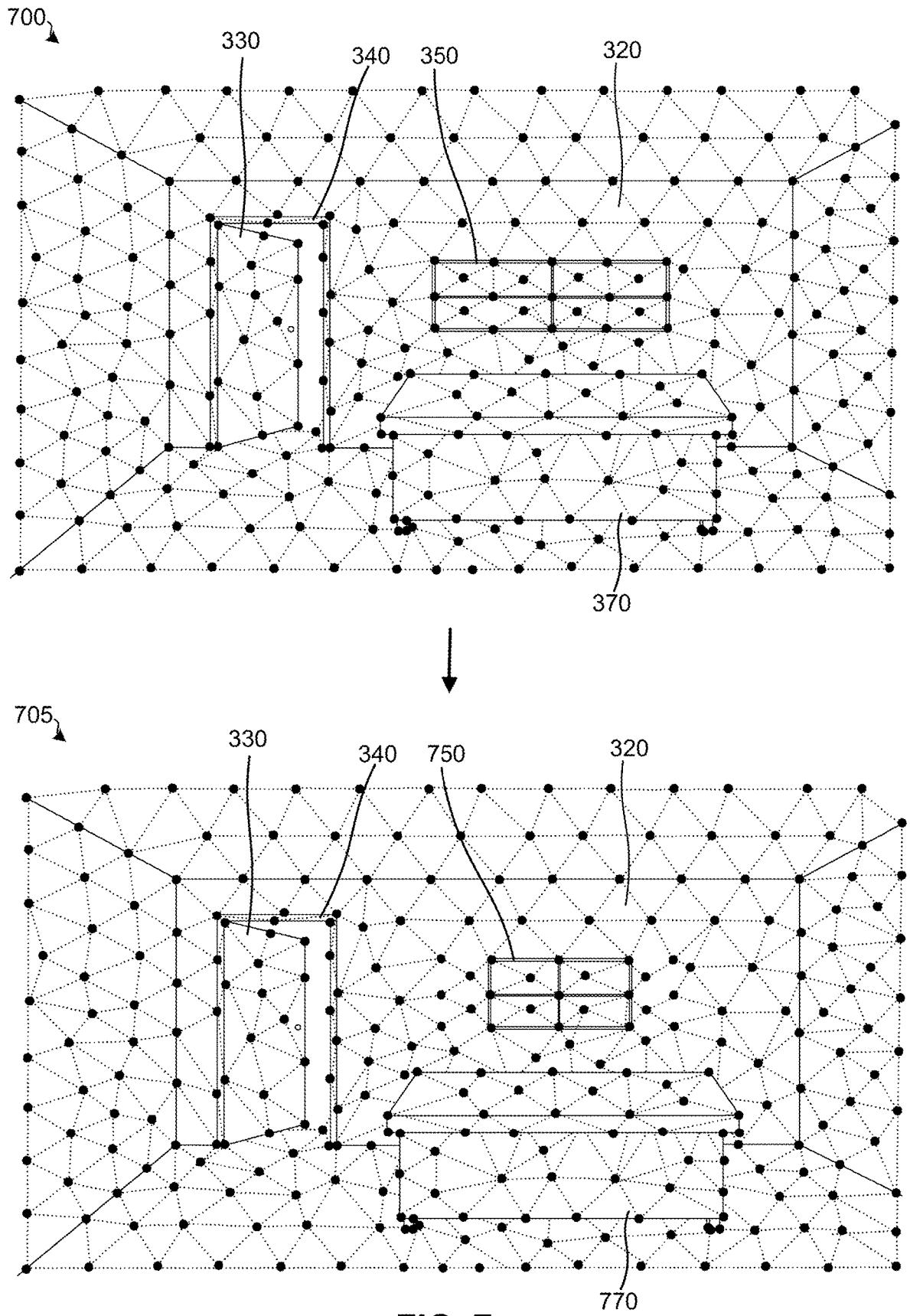
FIG. 7 illustrates changing the 3D mesh of FIG. 3 in accordance with some implementations.

FIG. 7 illustrates changing the 3D mesh of FIG. 3 to avoid a uniquely-identifying window shape. In this example, the uniquely-identifying shape of window 350 as shown in representation 700 is changed to the standard shape of window 750, as shown in representation 705.

J. Provide an Abstracted Version of a 3D Representation to Avoid User/Environment Identification Another approach is to provide apps with a high-level version of the 3D representation, removing uniquely-identifying details. For example, each app may be provided with only a relatively abstracted version of the 3D reconstruction, e.g., providing that a wall has a certain extent without providing the positions of the hundreds of polygons/triangles that form the wall. For example, a 3D mesh may be replaced in whole or in part with a parametric representation of the 3D mesh. Moreover, a parametric representation may be simplified (e.g., by rounding measurement and position parameters and/or generalizing semantic parameters) and/or altered with added noise to remove unique details.

Figure 8:
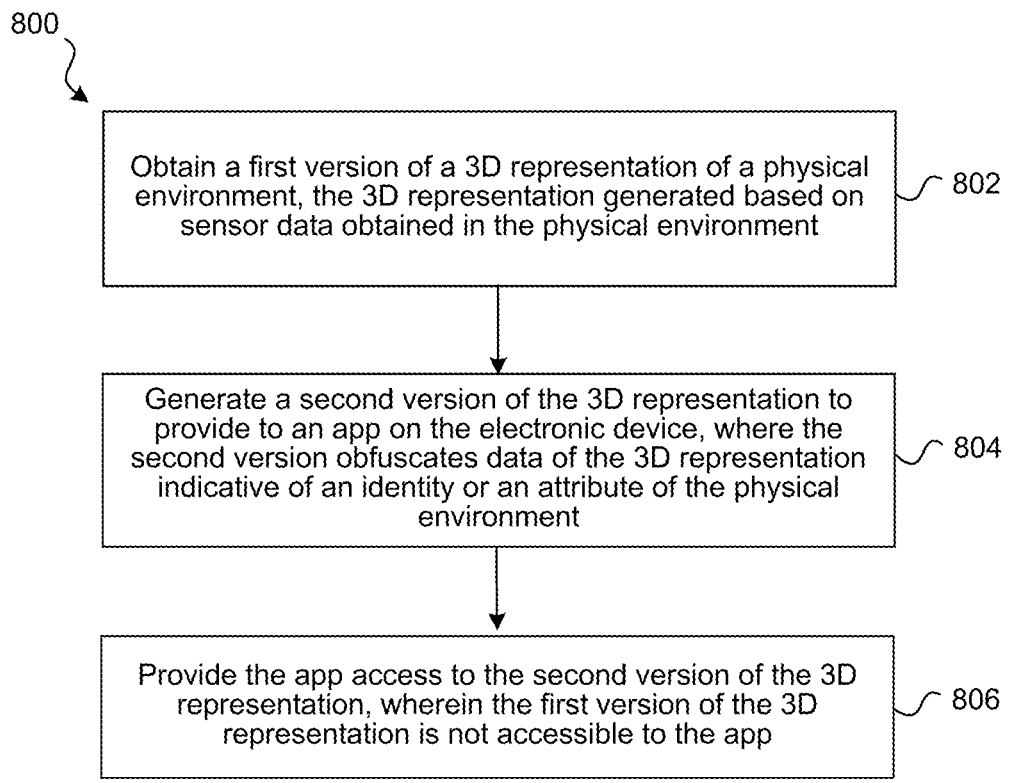
FIG. 8 is a flowchart illustrating a method for providing an app access to a 3D representation of a physical environment in accordance with some implementations.

FIG. 8 is a flowchart illustrating a method 800 for providing an app access to a 3D representation of a physical environment. In some implementations, a device such as electronic device 110 performs method 800. In some implementations, method 800 is performed on a mobile device, desktop, laptop, HMD, or server device. The method 800 is performed by processing logic, including hardware, firmware, software, or a combination thereof. In some implementations, the method 800 is performed on a processor executing code stored in a non-transitory computer-readable medium (e.g., a memory).

At block 802, the method 800 obtains a first version (e.g., a global/system version) of a 3D representation of a physical environment, the 3D representation generated based on sensor data obtained in the physical environment. The 3D representation may have various forms and include various data including, but not limited to, point cloud data, 3D mesh data, semantic data, or parametric 3D representation data, etc. The 3D representation may generated based on one or more types of data including, but not limited to, images, depth data, motion data, and ambient light sensor data. In some implementations, the sensor data comprises image data (e.g., from an RGB camera), depth data (e.g., a depth image from a depth camera), ambient light sensor data (e.g., from an ambient light sensor), and/or motion data from one or more motion sensors (e.g., accelerometers, gyroscopes, etc.). In some implementations, the sensor data includes visual inertial odometry (VIO) data determined based on image data. The 3D representation may be a 3D model such as a 3D point cloud or 3D mesh providing information about the positions and appearance of surface portions within the physical environment. In some implementations, the 3D representation is obtained over time, e.g., during a scan. The 3D representation may be updated and the updated instances of the 3D representation obtained over time. For example, a 3D point cloud may be obtained (and analyzed/processed) as it is updated over time.

At block 804, the method 800 generates a second version (e.g., an app-specific version) of the 3D representation to provide to an app on the electronic device, where the second version obfuscates data of the 3D representation indicative of an identity or an attribute of the physical environment. In some implementations, the method provides different apps different versions of the 3D representation. In some implementations, the method may provide an app different versions of the 3D representation on different occasions.

The obfuscating of the data of the 3D representation may change an identifier (e.g., a UUID) of the 3D representation. For example, generating the second version may involve changing a unique identifier of the 3D representation to different values for different apps.

The obfuscating of the data of the 3D representation may change the number of vertices/faces/chunks of the 3D representation, e.g., as illustrated in FIGS. 4A-4B). For example, the 3D representation may include or be a 3D mesh and generating the second version may involve changing a number of vertices or faces of the 3D mesh. In another example, the 3D representation may include or be a 3D point cloud and generating the second version may involve changing the number of points in the 3D point cloud, changing the number of points associated with a particular type of object (e.g., based on semantic point labels), and/or changing the number of points associated with a particular object.

The obfuscating of the data of the 3D representation may change a 3D mesh (e.g., adding face vertices/using different triangulation). For example, the 3D representation may be or include a 3D mesh and generating the second version may involve changing a triangulation of the 3D mesh.

The obfuscating of the data of the 3D representation may avoid memory address matching by providing per app copies of the 3D representation and/or using opaque object. For example, generating the second version may involve providing the second version at a different memory address separate from a memory address of the first version.

The obfuscating of the data of the 3D representation may apply small changes to mesh (curvature changes as illustrated in FIGS. 5A-5B) to avoid geometric description matching. For example, generating the second version may involve changing a geometry (e.g., curvature) of the 3D mesh.

The obfuscating of the data of the 3D representation may change the coordinate system of the 3D representation to avoid depth map matching of rasterizations. For example, generating the second version may involve defining the second version using a different coordinate system than a coordinate system used to define the first version.

The obfuscating of the data of the 3D representation may change the represented volume or add face walls/surfaces to the 3D representation to avoid volume matching. For example, generating the second version may involve altering the second version such that the second version has a volume different than the first version.

The obfuscating of the data of the 3D representation may change/round object measurements (e.g., TV size, countertop, etc.) to avoid user and/or environment identification and/or to avoid profiling of the user (e.g., characterizing user wealth based on television size, etc.). For example, generating the second version may involve altering the second version to change (e.g., round) sizes of objects, as illustrated in FIG. 6.

At block 806, the method 800 provides the app access to the second version of the 3D representation, where the first version of the 3D representation is not accessible to the app. The device may provide a 3D, XR environment in which the app provides 3D content based on its access to the second version of the 3D representation. In some implementations, an operating system on the device provides a view of an extended reality (XR) environment based on the 3D representation and the app provides 3D content that is displayed within the XR environment.

Figure 9:
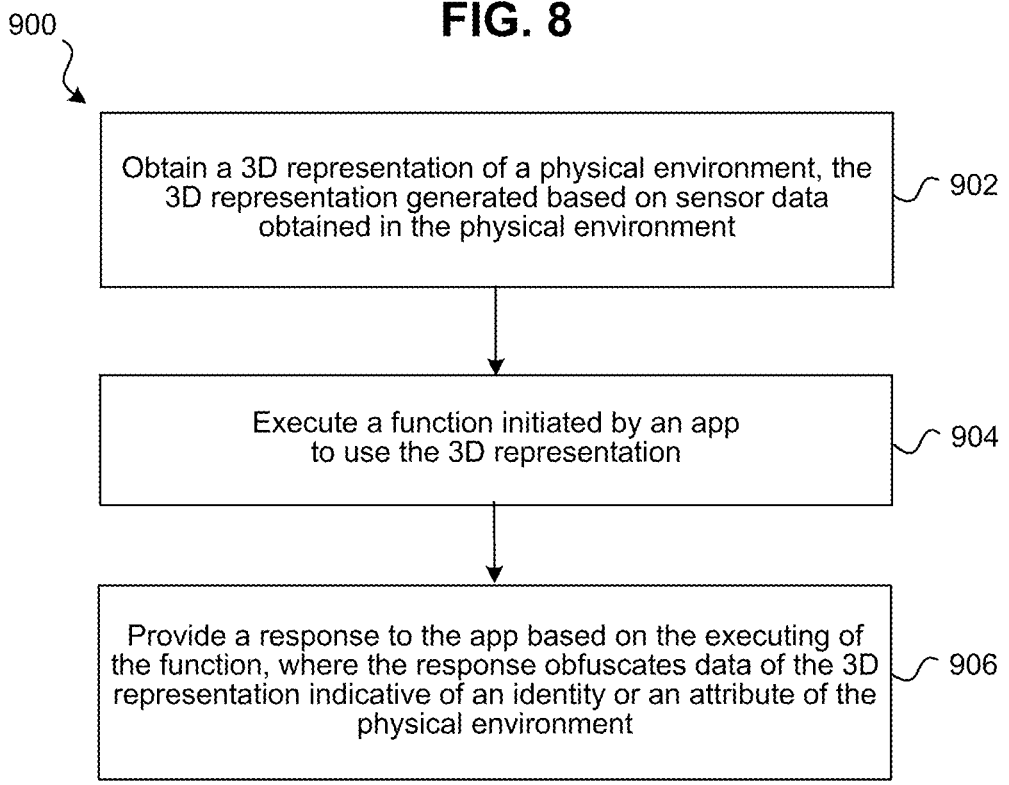
FIG. 9 is a flowchart illustrating another method for providing an app access to a 3D representation of a physical environment in accordance with some implementations.

FIG. 9 is a flowchart illustrating a method for another method for providing an app access to a 3D representation of a physical environment. In some implementations, a device such as electronic device 110 performs method 900. In some implementations, method 900 is performed on a mobile device, desktop, laptop, HMD, or server device. The method 900 is performed by processing logic, including hardware, firmware, software, or a combination thereof. In some implementations, the method 900 is performed on a processor executing code stored in a non-transitory computer-readable medium (e.g., a memory).

At block 902, the method 900 obtains a 3D representation of a physical environment, the 3D representation generated based on sensor data obtained in the physical environment. In some implementations, the sensor data comprises image data (e.g., from an RGB camera), depth data (e.g., a depth image from a depth camera), ambient light sensor data (e.g., from an ambient light sensor), and/or motion data from one or more motion sensors (e.g., accelerometers, gyroscopes, etc.). In some implementations, the sensor data includes visual inertial odometry (VIO) data determined based on image data. The 3D representation may be a 3D model such as a 3D point cloud or 3D mesh providing information about the positions and appearance of surface portions within the physical environment. In some implementations, the 3D representation is obtained over time, e.g., during a scan. The 3D representation may be updated and updated versions of the 3D representation obtained over time. For example, a 3D point cloud may be obtained (and analyzed/processed) as it is updated over time.

At block 904, the method 900 executes a function (e.g., a rendering function executed by a write shader of a GPU of the device) initiated by an app to use the 3D representation.

At block 906, the method 900 provides a response to the app based on the executing of the function, where the response obfuscates data of the 3D representation indicative of an identity or an attribute of the physical environment. The response may abstract specifics of objects. The response may obfuscates the data of the 3D representation by abstracting an object-specific detail. For example, the response may identify a wall rather than the hundreds of triangles representing the wall. As another example, the response may provide a bounding box of an object such as a chair without providing other details of the object. As another example, the response may add random noise to inhibit matching of 3D representation aspects. In some implementations, the function is a shader function having output that is limited to being an image.

The device may provide a 3D, XR environment in which the app provides 3D content based on it's the response to the function. In some implementations, an operating system on the device provides a view of an extended reality (XR) environment based on the 3D representation and the app provides 3D content that is displayed within the XR environment.

Figure 10:
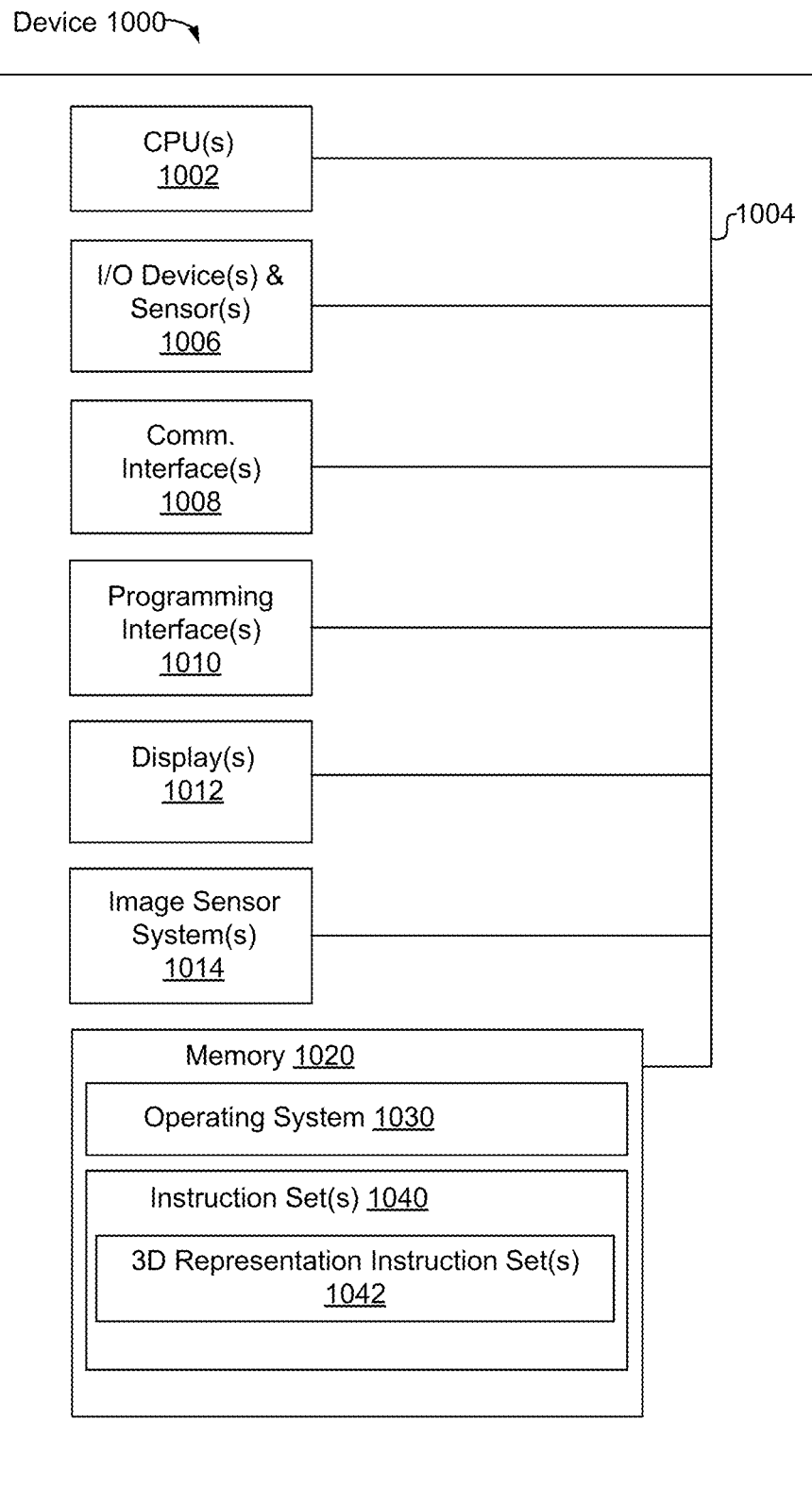
FIG. 10 is a block diagram of an electronic device of in accordance with some implementations.

FIG. 10 is a block diagram of electronic device 1000. Device 1000 illustrates an exemplary device configuration for electronic device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1000 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1010, one or more output device(s) 1012, one or more interior and/or exterior facing image sensor systems 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1012 include one or more displays configured to present a view of a 3D environment to the user. In some implementations, the one or more displays 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1000 includes a single display. In another example, the device 1000 includes a display for each eye of the user.

In some implementations, the one or more output device(s) 1012 include one or more audio producing devices. In some implementations, the one or more output device(s) 1012 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. The one or more output device(s) 1012 may additionally or alternatively be configured to generate haptics.

In some implementations, the one or more image sensor systems 1014 are configured to obtain image data that corresponds to at least a portion of a physical environment. For example, the one or more image sensor systems 1014 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1014 further include illumination sources that emit light, such as a flash. In various implementations, the one or more image sensor systems 1014 further include an on-camera image signal processor (ISP) configured to execute a plurality of processing operations on the image data.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium.

In some implementations, the memory 1020 or the non-transitory computer readable storage medium of the memory 1020 stores an optional operating system 1030 and one or more instruction set(s) 1040. The operating system 1030 includes procedures for handling various basic system services and for performing hardware dependent tasks. In some implementations, the instruction set(s) 1040 include executable software defined by binary information stored in the form of electrical charge. In some implementations, the instruction set(s) 1040 are software that is executable by the one or more processing units 1002 to carry out one or more of the techniques described herein.

The instruction set(s) 1040 include a 3D representation instruction set 1042 configured to, upon execution, obtain sensor data, provide views/representations, select sets of sensor data, generate 3D point clouds, 3D meshes, and/or other 3D representation data representing physical environments, and/or provide apps access to such 3D representation data as described herein. The instruction set(s) 1040 may be embodied as a single software executable or multiple software executables.

Although the instruction set(s) 1040 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor executing a system process and an app separate from the system process:
   obtaining, at the system process, a first version of a three-dimensional (3D) representation of a physical environment, the 3D representation generated based on sensor data obtained in the physical environment;
   generating, at the system process, a second version of the 3D representation to provide to the app on the electronic device, wherein the second version obfuscates data of the 3D representation indicative of an identity or an attribute of the physical environment; and providing the app access to the second version of the 3D representation for use by the app in providing content at the electronic device, wherein the first version of the 3D representation is not accessible to the app.

2. The method of claim 1, wherein generating the second version comprises changing a unique identifier of the 3D representation to different values for different apps.

3. The method of claim 1, wherein the 3D representation comprises a 3D mesh and generating the second version comprises changing a number of vertices or faces of the 3D mesh.

4. The method of claim 1, wherein the 3D representation comprises a 3D mesh and generating the second version comprises changing a triangulation of the 3D mesh.

5. The method of claim 1, wherein the 3D representation comprises a 3D mesh and generating the second version comprises changing a geometry of the 3D mesh.

6. The method of claim 1, wherein generating the second version comprises providing the second version at a different memory address separate from a memory address of the first version.

7. The method of claim 1, wherein generating the second version comprises defining the second version using a different coordinate system than a coordinate system used to define the first version.

8. The method of claim 1, wherein generating the second version comprises altering the second version such that the second version has a volume different than the first version.

9. The method of claim 1, wherein generating the second version comprises altering the second version to change sizes of objects.

10. The method of claim 1, wherein the 3D representation is a point cloud, a 3D mesh, or a parametric 3D representation generated based on images, depth data, and motion data.

11. The method of claim 1, wherein:
an operating system on the device provides a view of an extended reality (XR) environment based on the 3D representation; and
the app provides 3D content that is displayed within the XR environment.

12. The method of claim 1 further comprising:
generating multiple obfuscated versions of the 3D representation of the physical environment over time; and
providing one or more apps the multiple obfuscated versions of the 3D representation over time to prevent environment identification based on matching the multiple obfuscated versions of the 3D representations received by the one or more apps.

13. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
executing a system process and an app separate from the system process;
obtaining, at the system process, a first version of a three-dimensional (3D) representation of a physical environment, the 3D representation generated based on sensor data obtained in the physical environment;
generating, at the system process, a second version of the 3D representation to provide to the app, wherein the second version obfuscates data of the 3D representation indicative of the physical environment; and
providing the app access to the second version of the 3D representation for use by the app in providing content at the electronic device, wherein the first version of the 3D representation is not accessible to the app.

14. The system of claim 13, wherein generating the second version comprises changing a unique identifier of the 3D representation to different values for different apps.

15. The system of claim 13, wherein the 3D representation comprises a 3D mesh and generating the second version comprises changing a number of vertices or faces of the 3D mesh.

16. The system of claim 13, wherein the 3D representation comprises a 3D mesh and generating the second version comprises changing a triangulation of the 3D mesh.

17. The system of claim 13, wherein the 3D representation comprises a 3D mesh and generating the second version comprises changing a geometry of the 3D mesh.

18. The system of claim 13, wherein generating the second version comprises providing the second version at a different memory address separate from a memory address of the first version.

19. The system of claim 13, wherein generating the second version comprises defining the second version using a different coordinate system than a coordinate system used to define the first version.

20. The system of claim 13, wherein generating the second version comprises altering the second version such that the second version has a volume different than the first version.

21. A non-transitory computer-readable storage medium storing program instructions executable via one or more processors to perform operations comprising:
executing a system process and an app separate from the system process;
obtaining, at the system process, a first version of a three-dimensional (3D) representation of a physical environment, the 3D representation generated based on sensor data obtained in the physical environment;
generating, at the system process, a second version of the 3D representation to provide to the app, wherein the second version obfuscates data of the 3D representation indicative of an identity or an attribute of the physical environment; and
providing the app access to the second version of the 3D representation for use by the app in providing content at the electronic device, wherein the first version of the 3D representation is not accessible to the app.

* * * * *